(12) United States Patent
Ohsone et al.

(10) Patent No.: US 10,519,795 B2
(45) Date of Patent: Dec. 31, 2019

(54) RING MOLDED ARTICLE MANUFACTURING METHOD AND RING MATERIAL

(71) Applicants: Nippon Institute of Technology, Minamisaitama-gun, Saitama (JP); Hitachi Metals, Ltd., Tokyo (JP)

(72) Inventors: Jun Ohsone, Okegawa (JP); Masayuki Watanabe, Okegawa (JP); Hideo Takizawa, Saitama (JP)

(73) Assignees: Hitachi Metals, Ltd., Minato-Ku, Tokyo (JP); Nippon Institute of Technology, Minamisaitama-gun, Saitama (JP)

( * ) Notice: Subject to any disclaimer, the term of this patent is extended or adjusted under 35 U.S.C. 154(b) by 282 days.

(21) Appl. No.: 15/507,619

(22) PCT Filed: Aug. 27, 2015

(86) PCT No.: PCT/JP2015/074181
§ 371 (c)(1),
(2) Date: Feb. 28, 2017

(87) PCT Pub. No.: WO2016/035663
PCT Pub. Date: Mar. 10, 2016

(65) Prior Publication Data
US 2017/0284217 A1    Oct. 5, 2017

(30) Foreign Application Priority Data

Sep. 1, 2014    (JP) .................................. 2014-177025

(51) Int. Cl.
*B21K 1/76* (2006.01)
*B21K 5/06* (2006.01)
(Continued)

(52) U.S. Cl.
CPC ............. *F01D 11/006* (2013.01); *B21H 1/06* (2013.01); *B21J 5/06* (2013.01); *B21J 13/02* (2013.01);
(Continued)

(58) Field of Classification Search
CPC ........ B21J 1/02–025; B21J 1/04; B21J 5/002; B21J 5/02; B21J 5/025; B21J 5/06;
(Continued)

(56) References Cited

U.S. PATENT DOCUMENTS

| 4,084,419 A | 4/1978 | Dittrich et al. |
| 2011/0158844 A1* | 6/2011 | Ohsone ................. C22C 19/056 |
| | | 420/448 |
| 2014/0157851 A1 | 6/2014 | Takizawa et al. |

FOREIGN PATENT DOCUMENTS

| CN | 100467156 C | * 3/2009 |
| GB | 1 572 645 | 3/1977 |

(Continued)

OTHER PUBLICATIONS

Translation of CN-100467156-C (Year: 2009).*

(Continued)

*Primary Examiner* — Matthew P Travers
(74) *Attorney, Agent, or Firm* — Meunier Carlin & Curfman LLC (57) ABSTRACT

Various implementations include a method of manufacturing a ring molded article. The ring molded article has two convex portions which respectively protrude on both sides of the ring molded article in a direction of a center axis thereof and extend in a direction of a circumference of the ring molded article. The ring material is placed inside two molds on which concave portions respectively corresponding to the convex portions are formed. The ring material is supported by a region on an outer peripheral side from an (Continued)

outer peripheral side corner in the concave portion of one of the two molds and a region on an inner peripheral side from an inner peripheral side corner in the concave portion of another of the two molds. The ring material is then forged so as to be pressed by the two molds in a direction of a center axis of the ring material.

1 Claim, 5 Drawing Sheets (51) Int. Cl.
*B21J 13/02* (2006.01)
*B23P 15/00* (2006.01)
*F01D 11/00* (2006.01)
*B21H 1/06* (2006.01)
*F02C 7/00* (2006.01)
*C22C 19/03* (2006.01)
*C22C 19/07* (2006.01)
*F01D 5/06* (2006.01)
*B21J 5/06* (2006.01)
*F01D 25/00* (2006.01)

(52) U.S. Cl.
CPC .............. *B21K 1/761* (2013.01); *C22C 19/03* (2013.01); *C22C 19/07* (2013.01); *F01D 5/06* (2013.01); *F02C 7/00* (2013.01); *B23P 15/006* (2013.01); *F01D 25/00* (2013.01); *F05D 2230/25* (2013.01); *F05D 2260/30* (2013.01)

(58) Field of Classification Search
CPC .... B21J 5/12; B21J 13/02; B21K 1/28; B21K 1/32; B21K 1/761; B21K 21/02; B21K 21/06; F05D 2230/25; B23P 15/006; F01D 5/02; F01D 5/06; Y10T 29/49316; Y10T 29/4932

See application file for complete search history.

(56) References Cited

FOREIGN PATENT DOCUMENTS

| JP | 52-131967 | 11/1977 |
|---|---|---|
| JP | S61-132241 A | 6/1986 |
| JP | 62-286640 A | 12/1987 |
| JP | H06-15401 A | 1/1994 |
| JP | 2011-056548 A | 3/2011 |
| JP | 2011-079043 A | 4/2011 |
| JP | 2011-255409 A | 12/2011 |
| JP | 2011-255410 A | 12/2011 |

OTHER PUBLICATIONS

International Search Report from PCT/JP2015/074181 dated Nov. 24, 2015.
Cha, Do-Jin, "Hot Shape Forging of Gas Turbine Disk Using Microstructure Prediction and Finite Element Analysis," International Journal of Precision Engineering and Manufacturing, vol. 12, No. 1, pp. 331-336, Apr. 2011.
Supplementary European Search Report, Application No. EP 15838920; dated Feb. 7, 2018.

* cited by examiner

FIG.9

RING MOLDED ARTICLE MANUFACTURING METHOD AND RING MATERIAL

RELATED APPLICATIONS

The present application claims priority to Japanese Patent Application No. 2014-177025 filed on Sep. 1, 2014, and PCT/JP2015/074181 filed on Aug. 27, 2015, the disclosure of which are incorporated by reference in their entireties.

TECHNICAL FIELD

The present invention relates to a ring molded article manufacturing method in which forging is used. In addition, the present invention relates to a ring material to be forged to produce the ring molded article.

BACKGROUND ART

For example, in an engine used for an aircraft or the like, a plurality of turbine disks are arranged side by side such that their center axes are positioned along one another, and a plurality of turbine blades are attached to each turbine disk so as to be apart from one another in a direction of a circumference of each turbine disk. In particular, in an engine used in an aircraft, high-temperature and high-pressure combustion gas, which is generated inside the engine, flows in a direction of the center axes from a front stage side of the turbine disks toward a rear stage side thereof, on peripheral portions of the turbine disks, and thus, the turbine disks, together with the turbine blades, rotate at a high speed around their center axes. The driving force generated by this rotation is transmitted to a compressor and fans which are located on the front stage side of the turbine disks in the direction of the center axes, and compressed air necessary for continuous combustion of the gas, and propulsion, are thus obtained.

Generally, a turbine disk is produced by an operation in which a molding article formed in a substantially ring-like shape (hereinafter referred to as a "ring molded article"), is subjected to cutting or the like. In this ring molded article, typically, convex portions respectively protrude on both sides of the ring molded article in a direction of a center axis thereof, and furthermore, the convex portions extend in a direction of a circumference of the ring molded article.

An outer periphery of the turbine disk is exposed to combustion gas, and a temperature thereat becomes as high as approximately 600 degrees C. to 700 degrees C. Meanwhile, a temperature at an inner periphery thereof is lower than that at the outer periphery. Thermal stress is generated in an inside of this turbine disk because the engine is repeatedly started and stopped. Therefore, it is desired for the turbine disk to have excellently low cycle fatigue characteristics. Furthermore, centrifugal force is applied to the outer periphery of the turbine disk according to a high-speed rotation around the axis thereof at high temperatures. Therefore, it is desired for the turbine disk to further have a high creep strength characteristic. In addition, it is desired for the turbine disk to have a high tensile strength and a high yield strength. Therefore, it is desired for the ring molded article used in the turbine disks, to have a sufficiently high mechanical strength appropriate for the above desires.

Accordingly, in an example of a method for manufacturing a ring molded article, to secure a mechanical strength of the ring molded article, a material formed to be shaped in a substantially ring-like shape (hereinafter referred to as a "ring material"), is formed into the ring molded article by forging (forging press). More specifically, the ring material is placed into two molds on which concave portions respectively corresponding to the convex portions of the ring molded article are formed respectively, and the ring material is then subjected to the forging so as to be sandwiched and pressed between the two molds. In the forging, the ring material in the form of fluid fills the concave portions of the two molds so as to form the convex portions of the ring molded article, and the ring molded article is thus obtained (for example, see Patent Literatures 1 and 2). In the forging, strain is imparted to the ring molded article, crystal grains forming the ring molded article are thus refined, and thereby mechanical strengths, such as a tensile strength and fatigue strength, can be, in particular, improved. For equipment used for forging, a hydraulic-control forging press machine which can strictly control a speed of the forging, has often been used. In addition, the ring molded articles produced by the above example of the manufacturing method, have often been used for producing large turbine disks.

CITATION LIST

Patent Literature

Patent Literature 1: JP S52-131967 A
Patent Literature 2: JP 2011-079043 A

SUMMARY OF INVENTION

Technical Problem

Regarding the forging process described above, it becomes difficult to impart strain to a surface region of the ring material which is in contact with the mold, particularly in an initial stage of the forging, because the material adheres to the mold. Furthermore, in the forging process, a temperature of the surface region of the ring material, which is in contact with the mold, is decreased in comparison with a temperature of a center region of the ring material according to influence from heat release to the mold which is primarily made of a metal. According to these factors, a region of the ring molded article corresponding to the surface region which is in contact with the mold, particularly at the initial stage of the forging, may have a rough structure in comparison with the center region of the ring molded article, and thus, it becomes difficult for this region to obtain desired mechanical characteristics. The above region is known as a "dead metal" region. It is desired to avoid this dead metal remaining in a region of the ring molded article which is used as a turbine disk (hereinafter referred to as a "turbine disk region"). To prevent the turbine disk region from including the dead metal region, an excess portion of the ring molded article is previously provided such that a thickness thereof is increased, and the excess portion is then removed by a cutting after the forging.

However, in the above example of the ring molded article manufacturing method, at start of the forging and at the initial stage of the forging, the ring material, which is placed inside the two molds, is in contact with an entirety of regions which range from an opening of the concave portion of the mold to both inner peripheral and outer peripheral sides of the concave portion respectively. As a result, it becomes difficult to impart strain to a wide range of the surface region of the ring material, a temperature in a wide range of the surface region of the ring material may easily decrease, and thus, the dead metal regions may be increased in the ring molded article which is produced in the above manner. It is necessary to further increase an amount of the excess portions of the ring molded article corresponding to the dead metal regions and then remove large amounts of the excess portions. Accordingly, it is desired to provide near-net-shape forging in which the dead metal regions can be reduced so that the excess portions can be reduced.

Furthermore, in the above example of the method for manufacturing the ring molded article, it is difficult for the ring material in the form of fluid to fill an inside of the concave portion of the mold in the forging process if the two convex portions of the ring molded article to be produced, are offset relative to each other in a radial direction of the ring molded article. As a result, it becomes difficult to form the convex portions of the ring molded article, it becomes difficult to produce the ring molded article, and thus, a problem arises.

The present invention has been made in consideration of the above-described circumstances, and an object of the present invention is to provide a ring molded article manufacturing method capable of reliably and efficiently producing a ring molded article in which dead metal regions are reduced. Furthermore, another object of the present invention is to provide a ring material being subjected to forging to be capable of producing a ring molded article in which dead metal regions are reduced.

Solution to Problem

To solve the above-described problem, according to a ring molded article manufacturing method in an aspect of the present invention, the method is to manufacture a ring molded article having two convex portions which respectively protrude on both sides of the ring molded article in a direction of a center axis thereof and extend in a direction of a circumference of the ring molded article, the method including a step of producing the ring molded article, in this step, a ring material being placed inside two molds on which concave portions respectively corresponding to the convex portions are respectively formed, in a condition in which the ring material is supported by a region located on an outer peripheral side from an outer peripheral side corner in the concave portion of one of the two molds and a region located on an inner peripheral side from an inner peripheral side corner in the concave portion of another of the two molds, the ring material being then forged so as to be pressed by the two molds in a direction of a center axis of the ring material, and the ring molded article thus being produced. According to a ring material in an aspect of the present invention, the ring material is subjected to forging to produce a ring molded article having two convex portions which respectively protrude on both sides of the ring molded article in a direction of a center axis thereof and extend in a direction of a circumference of the ring molded article, wherein if one half section of the ring material is divided into one side region and another side region in a direction of a center axis of the ring material based on a middle of a maximum height of the ring material in the direction of the center axis of the ring material, a straight line passing through a center of gravity of the one side region and a center of gravity of the another region, is inclined by an angle relative to the center axis of the ring material, of which a range is 7 degrees to 40 degrees.

Advantageous Effects of Invention

According to a method for manufacturing a ring molded article in an aspect of the present invention, the ring molded article in which dead metal regions are reduced, can be reliably and efficiently produced. In addition, according to the ring material of an aspect of the present invention, by forging the ring material, the ring molded article in which dead metal regions are reduced, can be produced.

BRIEF DESCRIPTION OF DRAWINGS

FIG. 8($a$) is a half sectional view schematically showing a condition of arrangement of a ring-rolled article immediately before start of finishing forging in the manufacturing method according to the First Embodiment of the present invention.

FIG. 8($b$) is a half sectional view schematically showing a condition immediately after the finishing forging is completed.

DESCRIPTION OF EMBODIMENTS

Figure 3:
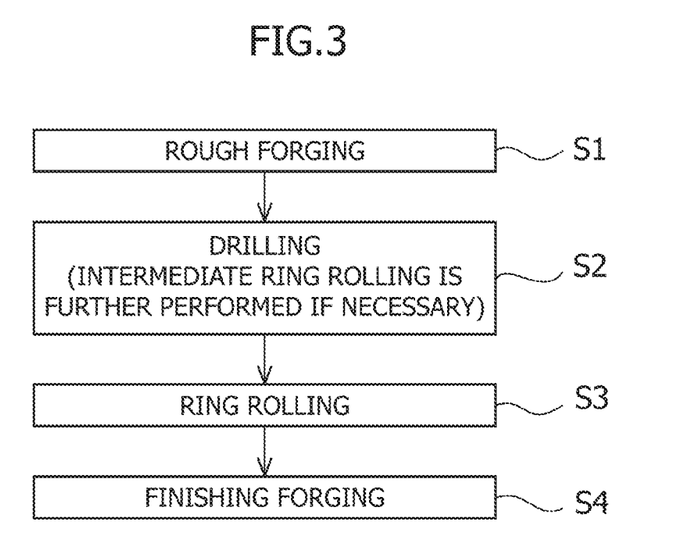
FIG. 3 is a flow chart for explaining the manufacturing method according to the First Embodiment of the present invention.
Figure 4:
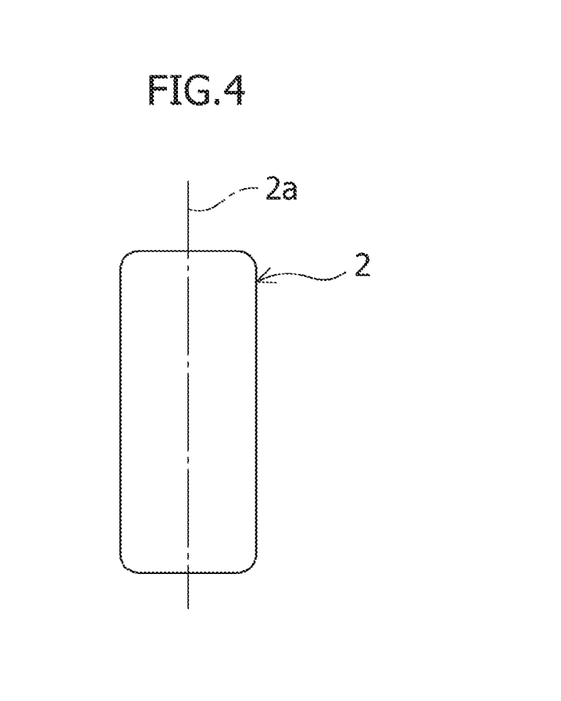
FIG. 4 is a full sectional view schematically showing a billet to be subjected to rough forging in the manufacturing method according to the First Embodiment of the present invention.
Figure 5:
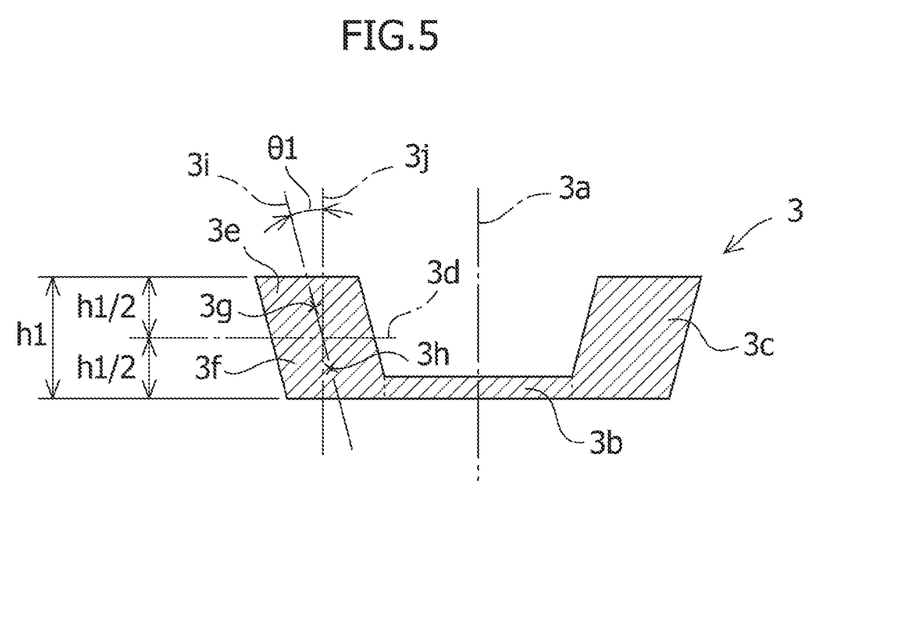
FIG. 5 is a plan view schematically showing a rough-forged article made by rough forging in the manufacturing method according to the First Embodiment of the present invention.
Figure 6:
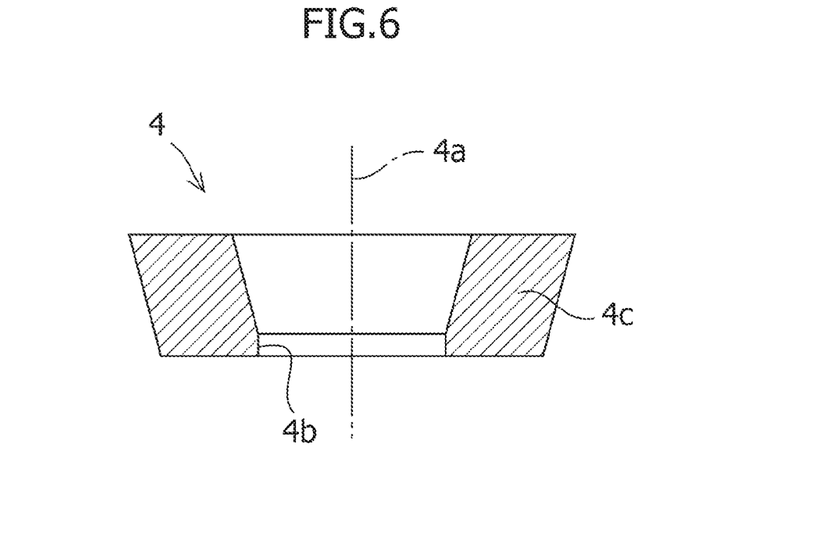
FIG. 6 is a full sectional view schematically showing a drilled article made by a drilling process in the manufacturing method according to the First Embodiment of the present invention.
Figure 7:
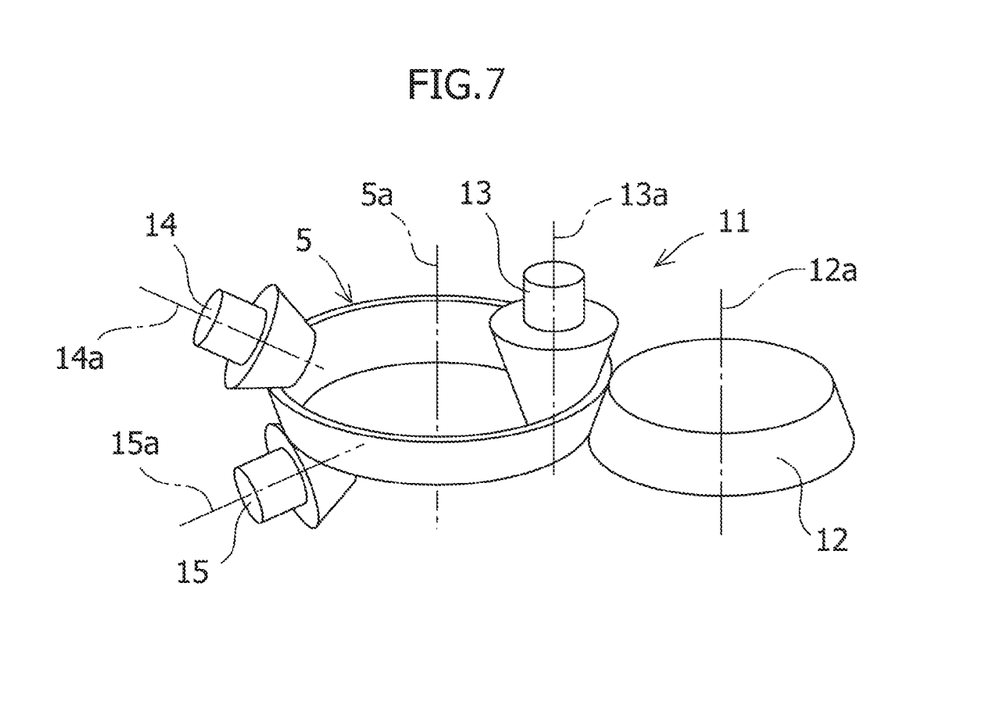
FIG. 7 is a diagram for explaining ring rolling in the manufacturing method according to the First Embodiment of the present invention.
Figure 8A:
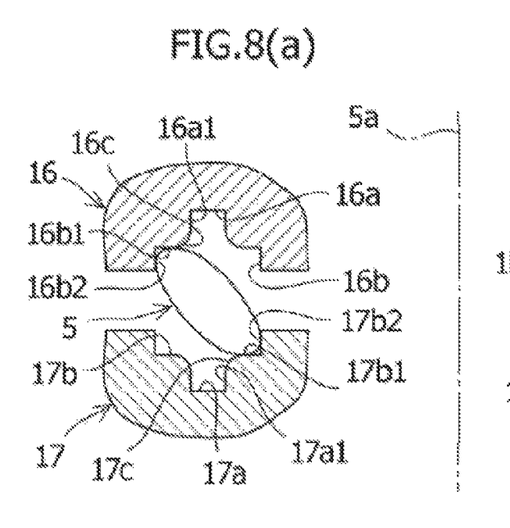
Figure 8B:
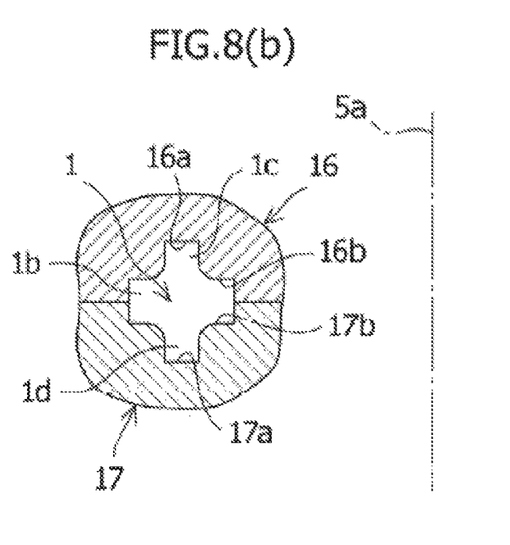
Figure 9:
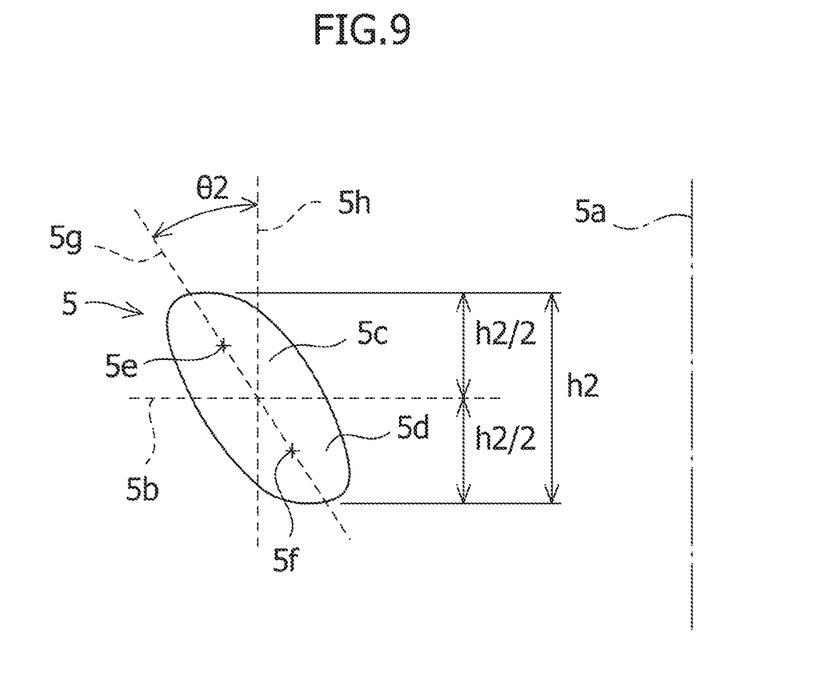
FIG. 9 is a half sectional view schematically showing the ring-rolled article of FIG. 8($a$).

A method for manufacturing a ring molded article and a ring material used for manufacturing the ring molded article according to First to Third Embodiments of the present invention will be described below with reference to FIGS. 1 to 9. Note that in the First to Third Embodiments of the present invention, the following expressions are used for a section of an article which is substantially symmetric based on a center axis (hereinafter referred to as a "symmetric article"), and drawings which show such sections. Among sections obtained by cutting a symmetric article along a plane passing through the center axis, one of which will be referred to as a "half section", and a drawing, such as FIGS. 2, 8, and 9, showing this half section will be referred to as a "half sectional view". An entire section of a symmetric article obtained by cutting the symmetric article along a plane passing through the center axis will be referred to as a "full section", and a drawing, such as FIGS. 4 to 6, showing this full section will be referred to as a "full sectional view".

First Embodiment

A ring molded article produced by a manufacturing method according to the First Embodiment of the present invention will be described below. A ring molded article is used for producing a turbine disk in an engine for an aircraft or the like. Furthermore, the turbine disk is produced by an operation in which a ring molded article after molding is processed by heat treatment, an operation in which an excess portion of a ring molded article is removed, and the like. Typically, a ring molded article is made of metals, and in the present Embodiment, a ring molded article is produced of Ni-base alloy 718. However, the present invention is not limited to this. More specifically, any metal which enables manufacturing of a ring molded article having high strength at high temperatures, can be used. As an example, a ring molded article may be produced by using a Ni-base alloy, a Fe-base alloy, a Co-base alloy, or the like which has a high strength at high temperatures.

Figure 1:
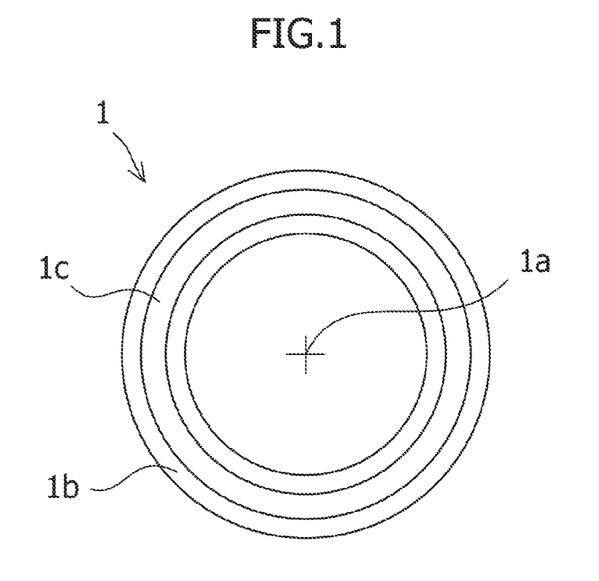
FIG. 1 is a plan view schematically showing a ring molded article which is produced by a manufacturing method according to a First Embodiment of the present invention.
Figure 2:
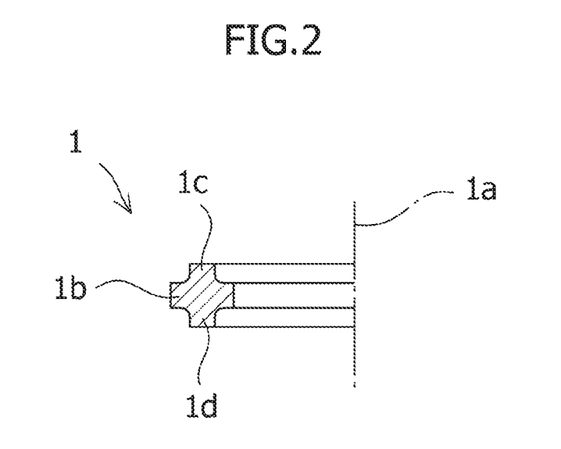
FIG. 2 is a half sectional view of the ring molded article which is produced by the manufacturing method according to the First Embodiment of the present invention.

As shown in FIGS. 1 and 2, the ring molded article includes a base portion 1b which is formed in a substantially ring-like shape around a center axis 1a thereof. The ring molded article 1 includes a one side convex portion 1c and an another side convex portion 1d which protrude from the base portion 1b on both sides of the ring molded article 1 in a center axis direction thereof respectively. The two convex portions 1c and 1d are formed so as to extend in a direction of a circumference of the ring molded article 1. Note that in FIG. 2, the one side convex portion 1c and the another side convex portion 1d of the ring molded article 1 substantially coincide with each other in a radial direction of the ring molded article 1. However, in an alternative feature, the one side convex portion 1c and the another side convex portion 1d of the ring molded article 1 can be offset relative to each other in the radial direction of the ring molded article 1.

An outline of the above method for manufacturing the ring molded article 1 will be described with reference to FIG. 3. A billet 2 (shown in FIG. 4) is subjected to rough forging as first forging, and thus, a rough-forged article 3 (shown in FIG. 5) is produced as a first forged article (Rough forging step (First forging step) S1). The rough-forged article 3 is processed by drilling so that a drilled article 4 is made (shown in FIG. 6). Note that the drilled article 4 may be further processed by intermediate ring rolling if necessary (drilling step S2). The drilled article 4 is ring-rolled so that a ring-rolled article 5 (shown in FIGS. 8(a) and 9) configured as a ring material, is made (ring rolling step S3). The ring-rolled article 5 is processed by finish forging as second forging so that the above ring molded article 1 configured as a second forged article, is made (finishing forging step (second forging step) S4).

Details of each step in the method for manufacturing the ring molded article 1 will be described below.

Regarding Rough Forging Step S1

Details of the rough forging step S1 will be described below. As shown in FIG. 4, the billet 2 formed in a substantially cylindrical shape around a center axis 2a as a material to be processed by rough forging, is produced by using Ni-base alloy 718, and then, the billet 2 is pressed by using molds and the like so that the rough-forged article 3 shown in FIG. 5 is produced. As an example, if the billet 2 is to be produced by using Ni-base alloy 718, it is preferable that a heating temperature for the billet 2 used in the rough forging step S1 be in a range of 900 degrees C. to 1075 degrees C. However, the present invention is not limited to this. More specifically, if the billet 2 is to be produced by using a metal other than Ni-base alloy 718, the heating temperature may be set so as to be adapted to rough forging which is performed on the above billet.

As shown in FIG. 5, the rough-forged article 3 is formed so as to include a bottom 3b which is formed in a substantially disc-like shape around a center axis 3a, and a peripheral wall 3c which is inclined to a direction from a center of the bottom 3b to an outer periphery thereof, in a direction from the center of the bottom 3b to one side of a center axis direction of the bottom 3b. Note that in FIG. 5, a broken line indicates a boundary between the bottom 3b and the peripheral wall 3c. In the drilling process described below, the bottom 3b is removed along the broken line. In the above rough-forged article 3, if a half section of the peripheral wall 3c is divided into a one side region 3e and an another side region 3f in a center axis direction of the rough-forged article 3 based on a middle line 3d for a maximum height h1 of the rough-forged article 3 in the center axis direction thereof, a straight line 3i which passes through a center of gravity 3g of the one side region 3e and a center of gravity 3h of the another side region 3f, is inclined by an angle θ1 relative to a parallel line 3j which is in parallel with the center axis 3a of the rough-forged article 3, i.e., relative to the center axis 3a of the rough-forged article 3. It is preferable that the angle θ1 be in a range which is 7 degrees to 40 degrees.

Regarding Drilling Step S2

Details of the drilling step S2 will be described below. The rough-forged article 3 is processed by drilling, such as punching out with press working, cutting with a water cutter, or the like, such that the bottom 3b of the rough-forged article 3 shown in FIG. 5 is removed. As a result, the drilled article 4 including a through hole 4b which is formed along a center axis 4a, is produced as shown in FIG. 6. The drilled article 4 includes a peripheral wall 4c corresponding to the peripheral wall 3c of the rough-forged article 3. If necessary, the drilled article 4 may be processed by intermediate ring rolling.

Regarding Ring Rolling Step S3

The ring rolling step S3 will be described below. In the ring rolling step S3, as an example, a ring rolling apparatus 11 shown in FIG. 7 is used. The ring rolling apparatus 11 includes a main roll 12 which is located on an outer periphery side of the drilled article 4, and a mandrel roll 13 which is located on an inner periphery side of the drilled article 4. The outer peripheral surface of the main roll 12 and that of the mandrel roll 13 face each other. The main roll 12 is configured so as to be rotatable around a rotational axis 12a which passes through a center of the main roll 12 and extends substantially parallel with the center axis 4a of the drilled article 4. The outer peripheral surface of the main roll 12 is inclined so as to correspond to an outer peripheral surface of the ring-rolled article 5 to be produced. The mandrel roll 13 is also configured so as to be rotatable around a rotational axis 13a which passes through the center of the mandrel roll 13 and extends substantially in parallel with the center axis 4a of the drilled article 4. The outer peripheral surface of the mandrel roll 13 is inclined so as to correspond to an inner peripheral surface of the ring-rolled article 5 to be produced. However, the present invention is not limited to this. More specifically, the main roll and the mandrel roll may be formed in a substantially cylindrical shape and the rotational axis of the main roll and the mandrel roll may be respectively arranged so as to be inclined in correspondence with the outer peripheral surface and the inner peripheral surface in the ring-rolled article 5 to be produced. In addition, the ring rolling apparatus 11 includes a pair of axial rolls 14, 15 located on both sides of the drilled article 4 in a center axis direction thereof. An outer peripheral surface of the axial roll 14 and that of the axial roll 15 face each other. Each of the axial rolls 14, 15 is configured so as to be rotatable around a rotational axis 14a, 15a which passes through the center of the corresponding axial roll.

In the ring rolling step S3 in which the above ring rolling apparatus 11 is used, first, the drilled article 4 is charged into the ring rolling apparatus 11. As an example, if the drilled article 4 is to be produced by using Ni-base alloy 718, it is preferable that a heating temperature for the drilled article 4 to be charged into the ring rolling apparatus 11, be in a range of 900 degrees C. to 1050 degrees C. However, the present invention is not limited to this. More specifically, if the drilled article 4 is to be produced by using a metal other than Ni-base alloy 718, the heating temperature may be set so as to be adapted to ring rolling performed on the above drilled article 4. The outer peripheral surface of the main roll 12 is brought into contact with the outer peripheral surface of the drilled article 4, the outer peripheral surface of the mandrel roll 13 is brought into contact with the inner peripheral surface of the drilled article 4, and furthermore, the outer peripheral surfaces of the axial roll pair 14, 15 are respectively brought into contact with both surfaces of the drilled article 4 in the center axis direction thereof. While the main roll 12 and the mandrel roll 13 are turned around the rotational axis 12a, 13a respectively the main roll 12 and the mandrel roll 13 sandwich and press the drilled article 4 in a radial direction of the drilled article 4. In addition, while the axial rollers 14, 15 are turned around the rotational axis 14a, 15a respectively, the pair of axial rolls 14, 15 sandwich and press the drilled article 4 in the center axis direction of the drilled article 4. As a result, the ring-rolled article 5 is produced.

The ring-rolled article 5 is formed so as to be shaped in a substantially ring-like shape around a center axis 5a of the ring-rolled article 5, and a half section of the ring-rolled article 5 is formed so as to be inclined. More specifically, as shown in FIG. 9, if the half section of the ring-rolled article 5 is divided into a one side region 5c and an another side region 5d in a center axis direction of the ring-rolled article 5 based on a middle line 5b for a maximum height h2 of the ring-rolled article 5 in the center axis direction thereof, a straight line 5g which passes through a center of gravity 5e of the one side region 5c and a center of gravity 5g of the another side region 5d, is inclined by an angle θ2 relative to a parallel line 5h which is in parallel with the center axis 5a of the ring-rolled article 5, i.e., relative to the center axis 5a of the ring-rolled article 5. It is preferable that the angle θ2 be in a range of 7 degrees to 40 degrees. Furthermore, it is more preferable that the angle θ2 be in a range of 10 degrees to 25 degrees. This is because if the angle θ2 is in the above range, sufficient amount of strain can be imparted to the material in the finishing forging step S4 described below so that the material may be appropriate, particularly as a material for aircraft turbine disks. The angle θ2 in the one half section of the ring-rolled article 5 may be either the same as or different from the angle θ1 in the one half section of the peripheral wall 3c of the rough-forged article 3. If the angle θ2 is different from the angle θ1, the drilled article 4 may be ring-rolled such that the above angle is changed.

In addition, as an example, the outer peripheral surface of the ring-rolled article 5 may be formed in a substantially arc-like shape which protrudes from the inner periphery of the ring-rolled article 5 toward the outer periphery thereof. Furthermore, to form the outer peripheral surface of the ring-rolled article 5 which is formed in the substantially arc-like shape, the outer peripheral surface of the main roll 12 may be formed in a substantially arc-like shape which recesses from the inner periphery of the ring-rolled article 5 toward outer periphery thereof so as to correspond to the outer peripheral surface of the ring-rolled article 5. The inner peripheral surface of the ring-rolled article 5 may be formed in a substantially arc-like shape which protrudes from the outer periphery of the ring-rolled article 5 to the inner periphery thereof. Furthermore, to form the inner peripheral surface of the ring-rolled article 5 which is formed in the above-described substantially arc-like shape, the outer peripheral surface of the mandrel roll 13 may be formed in a substantially arc-like shape which recesses from the outer periphery of the ring-rolled article 5 to the inner periphery thereof so as to correspond to the inner peripheral surface of the ring-rolled article 5.

Regarding Finishing Forging Step S4

The finishing forging step S4 will be described below. In the finishing forging step S4, a one side mold 16 and an another side mold 17 shown in FIGS. 8(a) and 8(b), are used. The one side mold 16 includes a concave portion 16a which corresponds to the one side convex portion 1c of the ring molded article 1, and an opening side concave portion 16b which corresponds to the one side region in the base portion 1b of the ring molded article 1. The another side mold 17 includes a concave portion 17a which corresponds to the another side convex portion 1d of the ring molded article 1, and an opening side concave portion 17b which corresponds to the another side region of the base portion 1b of the ring molded article 1.

In the finishing forging step S4, the ring-rolled article 5 is placed in the above two molds 16, 17, and then, the ring-rolled article 5 is sandwiched and pressed by the two molds 16, 17 in a center axis direction of the ring-rolled article 5. As an example, if the ring-rolled article 5 is produced by using Ni-base alloy 718, it is preferable that a heating temperature for the ring-rolled article 5 placed in the two molds 16, 17 be in a range of 900 degrees C. to 1050 degrees C. However, the present invention is not limited to this. More specifically, if the ring-rolled article 5 is produced of a metal other than Ni-base alloy 718, the heating temperature may be set to a temperature adapted to the finishing forging performed on the ring-rolled article 5.

In conditions in which the above ring-rolled article 5 is arranged, the ring-rolled article 5 is supported by a region which is located on the outer peripheral side from an outer peripheral side corner 16c in a concave portion 16a of the one side mold 16 (this region will be hereafter be referred to as an "outer peripheral side supporting region"), and a region which is located on the inner peripheral side from an inner peripheral side corner 17c in a concave portion 17a of the another side mold 17 (this region will be hereafter referred to as an "inner peripheral side supporting region"). Note that the above expression "outer peripheral side corner 16c in the concave portion 16a" indicates a corner located between an outer peripheral surface 16a1 in the concave portion 16a of the one side mold 16 and an outer peripheral side bottom surface 16b1 in the opening side concave portion 16b thereof, and the above expression "inner peripheral side corner 17c in the concave portion 17a" indicates a corner located between an inner peripheral surface 17a1 in the concave portion 17a of the another side mold 17 and an inner peripheral side bottom surface 17b1 in the opening side concave portion 17b thereof. Furthermore, it is preferable that the ring-rolled article 5 be arranged so as to be apart from regions other than the outer peripheral side supporting region of the one side mold 16 and the inner peripheral side supporting region of the another side mold 17. In other words, both ends of the ring-rolled article 5 in a direction of the inclined straight line 5g are in contact with the two molds 16, 17 respectively, and the ring-rolled article 5 is restricted by the two molds 16, 17 in the center axis direction of the ring-rolled article 5 and in the radial direction of the ring-rolled article 5.

In particular, in the present Embodiment, as shown in FIG. 8(*a*), the ring-rolled article 5 is supported by the outer periphery side bottom surface 16*b*1 and the outer peripheral surface 16*b*2 in the opening side concave portion 16*b* of the one side mold 16 and the inner peripheral side bottom surface 17*b*1 and the inner peripheral surface 17*b*2 in the opening side concave portion 17*b* of the another side mold 17. Furthermore, it is preferable that the ring-rolled article be arranged so as to be apart from regions other than the outer periphery side bottom surface 16*b*1 and the outer peripheral surface 16*b*2 in the opening side concave portion 16*b* of the one side mold 16 and the inner peripheral side bottom surface 17*b*1 and the inner peripheral surface 17*b*2 in the opening side concave portion 17*b* of the another side mold 17.

Furthermore, in the finishing forging, the ring-rolled article in the form of fluid fills the concave portion 16*a* and the opening side concave portion 16*b* of the one side mold 16 and the concave portion 17*a* and the opening side concave portion 17*b* of the another side mold 17. As a result, the ring molded article 1 is produced.

According to the above method for manufacturing the ring molded article 1 in the present Embodiment, in the finishing forging step S4, when placing the ring-rolled article 5 in the two molds 16, 17, the ring-rolled article 5 is supported by the outer periphery side supporting region of the one side mold 16 and the inner peripheral side supporting region of the another side mold 17, and furthermore, the ring-rolled article 5 is arranged so as to be apart from the regions other than the outer periphery side supporting region of the one side mold 16 and the inner peripheral side supporting region of the another side mold 17. Accordingly, in the finishing forging step S4, a contact area between the ring-rolled article 5 and the two molds 16, 17 can be reduced, and as a result, regions that the material of the ring-rolled article 5 adheres to the two molds 16, 17, can be reduced at the start of the finishing forging and at the initial stage of the finishing forging, and thus, sufficient strain can be imparted to the ring molded article 1 to be produced. In addition, it can be prevented that the temperature of the surface regions of the ring-rolled article 5 are decreased according to heat release to the two molds 16, 17, and thus, it can be prevented that crystals of metal structure in the surface regions of the produced ring molded article 1 are coarsened. Accordingly, the ring molded article 1 in which dead metal regions are reduced, can be reliably and efficiently produced. In addition, excess portions of the ring molded article 1 which is provided in correspondence with the dead metal regions, can be reduced, and thus, near-net-shape forging can be implemented. Furthermore, even if the one side convex portion 1*c* and the another side convex portion 1*d* of the ring molded article 1 are offset to each other in the radial direction of the ring molded article 1, the ring-rolled article 5 in the form of fluid securely fills into the concave portions 16*a*, 17*a* of the two molds 16, 17, and thus, the two convex portions 1*c*, 1*d* of the ring molded article 1 can be securely formed.

According to the method for manufacturing the ring molded article 1 in the present Embodiment and the ring-rolled article 5 configured as the ring material in the present Embodiment, the inclination angle θ2 of the ring-rolled article 5 which is placed in the two molds 16, 17, is within the range which is 7 degrees to 40 degrees, at the start of the finishing forging and the initial stage of the finishing forging. Accordingly, since the inclination angle θ2 is 7 degrees or more, in the finishing forging step S4, buckling of the ring-rolled article 5 can be prevented. Furthermore, since the inclination angle θ2 is 40 degrees or less, in the finishing forging step S4, a phenomenon in which a desired shape cannot be obtained according to unstable finishing forging caused by turning of the ring-rolled article 5 (this phenomenon will hereafter be referred to as a "phenomenon of turning of the ring-rolled article 5"), can be prevented. Accordingly, the ring molded article 1 in which the dead metal regions are reduced, can be reliably and efficiently produced.

Second Embodiment

A method for manufacturing a ring molded article according to a Second Embodiment of the present invention and a ring material used for manufacturing the ring molded article will be described. Basic features of the method for manufacturing the ring molded article according to the present Embodiment and the ring material used for manufacturing the ring molded article are substantially the same as those of the First Embodiment described above. However, the method for manufacturing the ring molded article and the ring material used for manufacturing the ring molded article according to the present Embodiment are different from those of the First Embodiment in the followings.

Although not shown in the drawing, in the ring-rolled article configured as the ring material, a recess section is formed so as to correspond to the outer peripheral side corner of the concave portion in the one side mold. As an example, the recess section may be formed by machine working, such as cutting, press working, or the like, after the ring rolling. In the finishing forging step, this ring-rolled article is supported by the outer peripheral side corner in the concave portion of the one side mold which engages the recess section, and also supported by the inner peripheral side bottom surface and the inner peripheral surface in the opening side concave portion of the another side mold. Furthermore, it is preferable that the ring-rolled article be arranged so as to be apart from regions other than the outer peripheral side corner in the concave portion of the one side mold and the inner peripheral side bottom surface and the inner peripheral surface in the opening side concave portion of the another side mold.

According to the above method for manufacturing the ring molded article in the present Embodiment and the above ring-rolled article configured as the ring material in the present Embodiment, in addition to the advantageous effects obtained by the First Embodiment, the following advantageous effects can be obtained. That is to say, since the recess section of the ring-rolled article engages the outer peripheral side corner in the concave portion of the one side mold, the ring-rolled article can be stably supported inside the two molds. Accordingly, the ring-rolled article in which the dead metal regions are reduced, can be reliably and efficiently produced.

Third Embodiment

A method for manufacturing a ring molded article according to a Third Embodiment of the present invention and a ring material used for manufacturing the ring molded article will be described. Basic features of the method for manufacturing the ring molded article and the ring material used for manufacturing the ring molded article according to the present Embodiment are substantially the same as those of the First Embodiment described above. However, the method for manufacturing the ring molded article and the ring material used for manufacturing the ring molded article according to the present Embodiment are different from those of the First Embodiment in the followings.

Although not shown in the drawing, in the ring-rolled article configured as the ring material, recess sections are formed which respectively correspond to an outer peripheral side corner in the concave portion of the one side mold and to an inner peripheral side corner in the concave portion of the another side mold. As an example, the recess sections may be formed by machine working, such as cutting, press working, or the like, after the ring rolling. In the finishing forging step, this ring-rolled article is supported by the outer peripheral side corner in the concave portion of the one side mold which engages the corresponding recess section of the two recess sections, and also supported by the inner peripheral side corner in the concave portion of the another side mold. Furthermore, it is preferable that the ring-rolled article is arranged so as to be apart from regions other than the outer peripheral side corner in the concave portion of the one side mold and the inner peripheral side corner in the opening side concave portion of the another side mold.

According to the above method for manufacturing the ring molded article in the present Embodiment and the above ring-rolled article configured as the ring material in the present Embodiment, in addition to the advantageous effects obtained by the First Embodiment, the following advantageous effects can be obtained. That is to say, since the recess sections of the ring-rolled article engage the outer peripheral side corner in the concave portion of the one side mold and the inner peripheral side corner in the concave portion of the another side mold respectively, the ring-rolled article can be stably supported inside the two molds. Accordingly, the ring-rolled article in which the dead metal regions are reduced, can be reliably and efficiently produced.

The Embodiments of the present invention are as described above; however, the present invention is not limited to them. More specifically, the present invention can be implemented by various modifications and alterations based on the technical idea of the present invention.

For example, as a modification of the present invention, the following feature may be employed. That is to say, in this feature, if the concave portions 16a, 17a of the two molds 16, 17 which are used in the finishing forging step S4, are offset in the radial direction of the ring molded article 1 so as to correspond to the one side convex portion 1c and the another side convex portion 1d in the ring molded article 1 which are offset in the radial direction, the ring-rolled article 5 can be supported in a condition in which the one half section of the ring-rolled article 5 is not inclined, i.e., in a condition in which the inclination angle θ2 for the one half section is 0 degrees. In this feature, for example, the one half section of the ring-rolled article 5 may be formed in a substantially rectangular shape, and furthermore, an amount of offset between the concave portions 16a, 17a of the two molds 16, 17 in the radial direction of the ring-rolled article 5 may be less than a thickness of the one side surface in the radial direction of the ring-rolled article 5. In this feature, the ring-rolled article 5 can be supported by the outer peripheral side supporting region of the one side mold 16 and the inner peripheral side supporting region of the another side mold 17. If the above feature is employed, the forging can be implemented such that the phenomenon of dead metal is suppressed. However, in view of stable arrangement of the ring-rolled article 5 and freedom of shape of the ring-rolled article 5, it is preferable to employ the feature in which the one half section of the ring-rolled article is inclined.

EXAMPLE

An EXAMPLE of the present invention will be described. In the present EXAMPLE, the ring molded article 1 to be produced, has dimensions with a maximum outer diameter of 1090 mm, a maximum thickness in the radial direction of 120 mm, and a maximum height in the direction of the center axis of 110 mm. In the finishing forging step S4 used for producing this ring molded article 1, the finishing forging step S4 is performed in a plurality of arrangement conditions, respectively, in which the inclination angle θ2 for the inclined one half section of the ring-rolled article 5 is set at 5 degrees, 7 degrees, 10 degrees, 20 degrees, 25 degrees, degrees, 40 degrees, 45 degrees, or 50 degrees. In the forging step for each arrangement condition, it is examined whether buckling of the ring-rolled article 5 occurs. In addition, in the forging step for each arrangement condition, it is examined whether the phenomenon of turning of the ring-rolled article 5 occurs.

As a result of the above examination, in a case in which the inclination angle θ2 is 5 degrees, buckling of the ring-rolled article 5 occurs. In each of cases in which the inclination angles θ2 are degrees and 50 degrees respectively, the phenomenon of turning of the ring-rolled article 5 occurs. On the other hand, in each of cases in which the inclination angles θ2 are 7 degrees, 10 degrees, degrees, 30 degrees, and 40 degrees respectively, the ring molded article 1 in which dead metal regions are reduced, can be reliably and efficiently produced. In each of cases in which the inclination angles θ2 are 10 degrees, 20 degrees, and 25 degrees respectively, in particular, the ring molded article 1 in which strain appropriate for applying to a material of aircraft turbine disks is sufficiently imparted and the dead metal regions are reduced, can be more reliably and more efficiently produced.

REFERENCE SIGNS LIST

1 Ring molded article
1a Center axis
1c One side convex portion
1d Another side convex portion
5 Ring-rolled article (Ring material)
5a Center axis
5b Middle line
5c One side region
5d Another side region
5e, 5f Center of gravity
5g Straight line
5h Parallel line
16 One side mold
16a Concave portion
16c Outer peripheral side corner in the concave portion
17 Another side mold
17a Concave portion
17c Inner peripheral side corner in the concave portion
θ1, θ2 Angle
S1 Rough forging step (First forging step)
S2 Drilling step
S3 Ring rolling step
S4 Finishing forging step (Second forging step)

The invention claimed is:
1. A ring molded article manufacturing method to manufacture a ring molded article having two convex portions which respectively protrude on opposite sides of the ring molded article in a direction of a center axis thereof and extend in a direction of a circumference of the ring molded article, the method comprising:
    producing the ring molded article, wherein a ring material is placed inside two molds on which concave portions respectively corresponding to the convex portions are respectively formed, in a condition in which the ring material is supported by a region located on an outer peripheral side from an outer peripheral side corner in the concave portion of one of the two molds and a region located on an inner peripheral side from an inner peripheral side corner in the concave portion of another of the two molds, the ring material being then forged so as to be pressed by the two molds in a direction of a center axis of the ring material and the ring molded article being thus produced, and
    wherein the ring material placed inside the two molds, is inclined such that a straight line passing through centers of gravity of first and second side regions, is inclined by an angle relative to the center axis of the ring material, the first and second side regions are obtained by virtually dividing a one half section of the ring material based on a middle of a maximum height of the ring material in the direction of the center axis of the ring material, and a range of the angle is 7 degrees to 40 degrees.

\* \* \* \* \*